(12) United States Patent
Allen

(10) Patent No.: US 8,360,005 B1
(45) Date of Patent: Jan. 29, 2013

(54) PROTECTIVE PET DISH APPARATUS

(76) Inventor: David L. Allen, Mesa, AZ (US)

( * ) Notice: Subject to any disclaimer, the term of this patent is extended or adjusted under 35 U.S.C. 154(b) by 194 days.

(21) Appl. No.: 12/949,648

(22) Filed: Nov. 18, 2010

Related U.S. Application Data

(60) Provisional application No. 61/262,779, filed on Nov. 19, 2009.

(51) Int. Cl.
*A01K 5/00* (2006.01)
(52) U.S. Cl. ........................... 119/61.53; 119/63
(58) Field of Classification Search ............... 119/61.53, 119/61.5, 62, 59, 51.5, 57.9, 63
See application file for complete search history.

(56) References Cited

U.S. PATENT DOCUMENTS

| 4,030,451 | A | * | 6/1977 | Miller | 119/57.9 |
| 4,207,839 | A | * | 6/1980 | Barry | 119/57.9 |
| 5,253,609 | A | | 10/1993 | Partelow et al. | |
| 5,277,149 | A | | 1/1994 | East | |
| 5,492,083 | A | | 2/1996 | Holladay | |
| 5,829,384 | A | * | 11/1998 | Landry | 119/52.3 |
| 5,954,011 | A | | 9/1999 | Martinez | |
| 6,155,205 | A | * | 12/2000 | Coates | 119/57.9 |
| 6,167,840 | B1 | | 1/2001 | White et al. | |
| 6,463,878 | B1 | * | 10/2002 | Moody | 119/57.9 |
| 7,146,929 | B2 | | 12/2006 | Ritchey et al. | |

* cited by examiner

Primary Examiner — Kristen C Hayes
(74) Attorney, Agent, or Firm — Booth Udall, PLC

(57) ABSTRACT

A protective pet dish apparatus that provides protection from birds and insects of food or water in a pet dish by a protective pet dish cover that is supported by a rod extending from the pet dish to the cover. The protective pet dish cover swivels away from the pet dish on the rod when a pet pushes its head against it and swivels back to cover the pet dish after the pet removes its head from the pet dish. The protective pet dish cover uses gravity or a combination of gravity and magnetic force along with the support and swiveling of the support rod to cover the food after a pet removes its head from the pet dish.

20 Claims, 7 Drawing Sheets

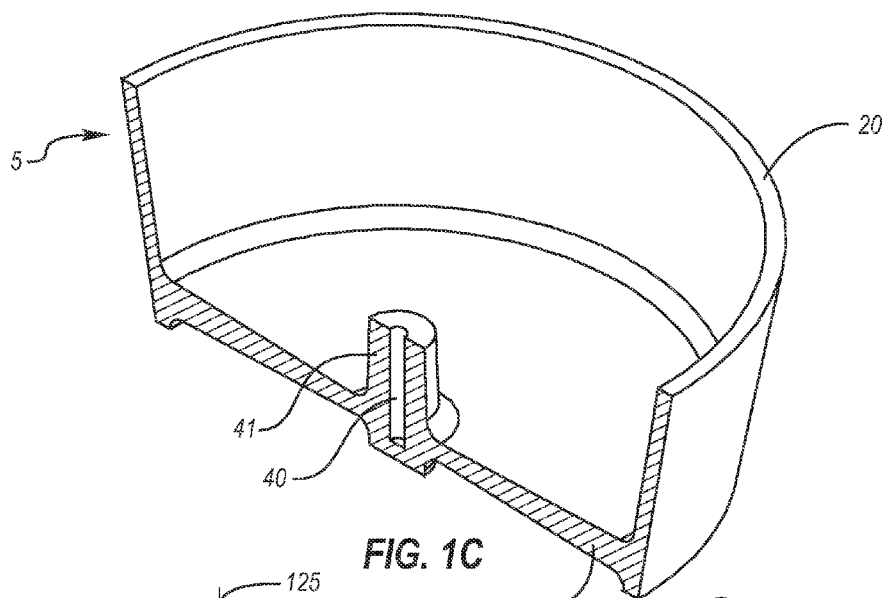
FIG. 1C
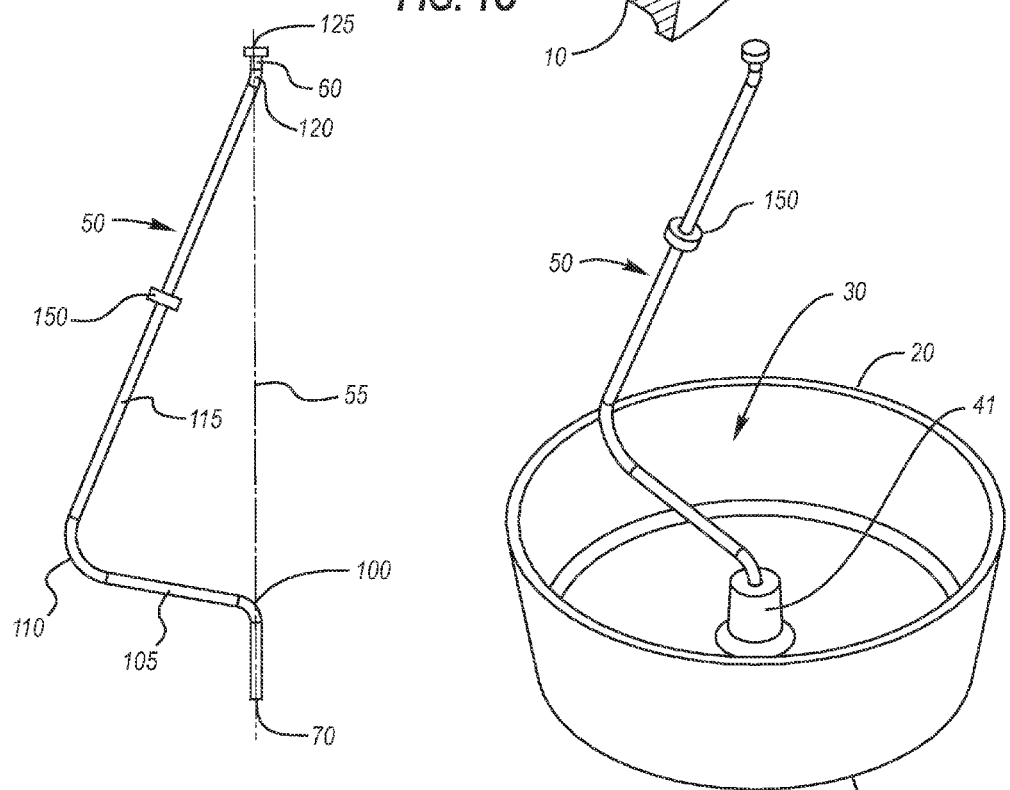
FIG. 2A
FIG. 2B

PROTECTIVE PET DISH APPARATUS

BACKGROUND

1. Field of the Invention

Implementations of the disclosed device relate generally to pet dishes that provide access to food and water by a pet while preventing access or protecting the pet dish from other animals or insects. More particularly, pet dishes with a rotating support rod with a magnetic platform at the top that a protective pet dish cover swivels upon to allow a pet access to the food or water in the pet dish, but causes the protective cover to be drawn back to center, covering the pet dish after the pet has accessed the pet dish. The various implementations may be manufactured using conventional procedures known to those of ordinary skill in the art as added to and improved upon through the procedures described herein.

2. Description of Related Art

Pet bowls or pet dishes are known in the art. Over the years there have been many different styles and types of pet dishes including some with covers or water filled reservoirs to keep the birds and insects from having access to the food or water in the pet dish. Birds eating pet food from a pet dish or flies landing on the pet food are common problems for pet dishes kept outdoors. Additionally, as pet owners have become more concerned with the health of their pets, access to a pet's food from birds and insects that may carry diseases is also a concern.

Monitoring the eating habits of a pet or regimenting the time allowed for a pet to access food or water is difficult for pet owners with varying schedules and time constraints, but leaving an open pet dish outside is also a concern. A self covering pet dish that requires minimal maintenance by the pet owner and is easy to use allows the pet owner to ensure a pet has access to an appropriate amount of food or water without worrying about a bird consuming the food or water. A self covering pet dish also reduces the pet owners concern for the health of a pet from birds and insects that could access the pet dish if it did not include a cover.

Applicant(s) believe(s) that the material incorporated above is "non-essential" in accordance with 37 CFR 1.57, because it is referred to for purposes of indicating the background of the inventions or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

SUMMARY

According to an aspect of the disclosure, a protective pet dish apparatus may comprise a pet dish having a base, a top and a bowl portion, the top having a size and shape, a substantially vertical shaft within the bowl portion extending toward the top, the substantially vertical shaft comprising a cylindrical opening surrounded by at least one shaft wall, a support rod comprising a cylindrical shape at a bottom end sized to fit within and pivotally rotate within the cylindrical opening of the substantially vertical shaft, an angled portion, and a top end comprising a support plate, the top end of the support rod positioned along a pivoting axis of the cylindrically shaped bottom end, a dish cover comprising a top and a bottom, the bottom sized to approximate the size and shape of the top of the pet dish, the top comprising a cover plate positioned along a center axis of the dish cover, wherein the dish cover is biased to its closed position, centered over the pet dish.

In particular implementations, the protective pet dish apparatus may have one or more of the following features. The support rod plate may comprise ferromagnetic materials and the cover plate comprises ferromagnetic materials and at least one of the support rod plate and the cover plate is magnetized. The dish cover may be biased to its closed position by magnetic attraction between the support rod plate and the cover plate. The substantially vertical shaft may comprise an extension that extends through the base of the pet dish. A gasket may surround the extension between the vertical shaft and the base of the pet dish. The substantially vertical shaft is positioned in approximately in a center of the bowl portion. The dish cover may comprise a handle extending from the top of the cover. At least one of the support rod plate and the cover plate may comprise a substantially flat surface. At least one of the support rod plate and the cover plate may comprise a semi-circular top surface. A bearing wheel may exist between the support rod and an internal wall of the pet dish cover. The bearing wheel may be mounted to the support rod.

According to another aspect of the disclosure, a protective pet dish apparatus may comprise a pet dish having a base, a top and a bowl portion, the top having a size and shape, a substantially vertical shaft extending upward at the center of the bowl portion, a cone-shaped pet dish cover comprising a narrow top and a wide bottom, the narrow top comprising a cover plate having a ferromagnetic material and a flat, planar surface on an inside surface of the pet dish cover, a support rod comprising a bottom end configured to pivotally rotate on the shaft, the support rod extending from the shaft to the narrow top of the pet dish cover and of a length to support the pet dish cover above the top of the pet dish, the support rod comprising a support rod plate at a top end having a ferromagnetic material and a flat, planar surface which contacts the flat, planar surface on the inside surface of the pet dish cover when the support rod supports the pet dish cover, wherein the support rod supports the pet dish cover such that the pet dish cover is centered over the pet dish and when force is applied to the wide bottom of the pet dish cover to shift the pet dish cover off-center in relation to the pet dish, magnetic attraction between the cover plate and the support rod plate biases the pet dish cover back to its closed position centered over the pet dish.

In particular implementations, the protective pet dish apparatus may have one or more of the following features. At least one of the support rod plate and the cover plate may be magnetized. The substantially vertical shaft may comprise an extension that extends through the base of the pet dish. A gasket may surround the extension between the vertical shaft and the base of the pet dish. The dish cover may comprise a handle extending from the top of the pet dish cover. A bearing wheel may exist between the support rod and an internal wall of the pet dish cover. The bearing wheel may be mounted to the support rod. The support rod may comprise at least two angled bends in the support rod, one positioned above the shaft to angle the support rod from the center of the bowl portion toward its edge, and one positioned in the support rod near the edge of the bowl portion to angle the support rod from near the edge toward the center axis of the bowl above the shaft. At least a third angled bend may be included in the support rod, the third angled bend positioned near the top end and angled to align the support rod with a pivotal axis of rotation for the support rod in relation to the shaft.

Aspects and applications of the disclosure and inventions presented here are described below with reference to the Drawings and the Detailed Description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 1A, 1B and 1C depict, respectively, top, side and perspective cross-sectional views of a pet dish;

FIG. 2A depicts a multi-angled support rod of a pet dish cover;

FIG. 2B depicts the multi-angled support rod of the pet dish cover of FIG. 2A mounted in a pet dish;

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1A:
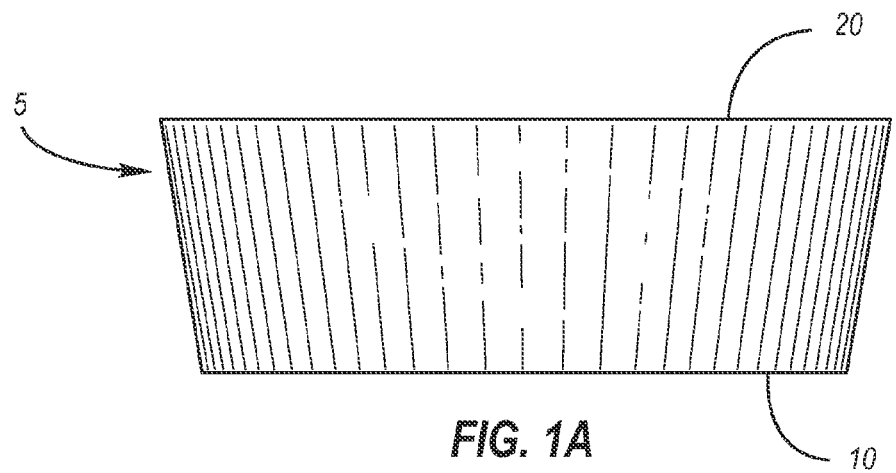
Figure 1B:
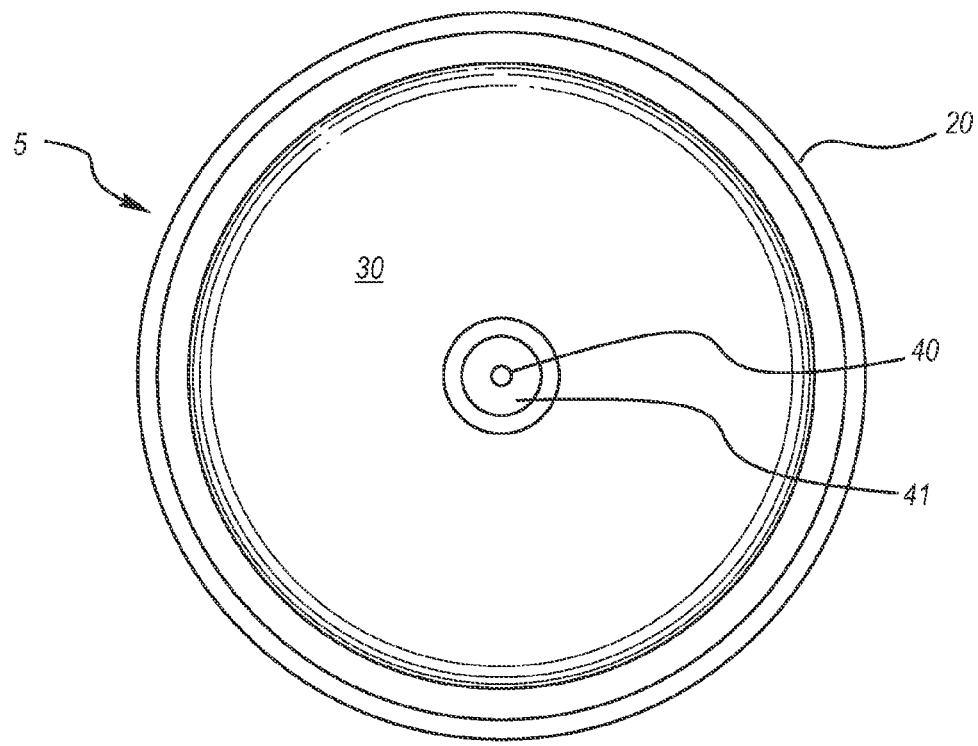

In one application of the invention a protective pet dish includes elements shown, but not limited to representations shown in FIGS. 1-5. Referring specifically to FIGS. 1A, 1B and 1C (collectively FIG. 1), respective top, side and cross-sectional side views of a pet dish 5 with a base 10, a top 20, and a bowl portion 30 is depicted. The pet dish of FIG. 1 also includes a shaft 40 at the bottom of the pet dish bowl portion 30 that allows insertion of a support rod 50 (FIG. 2). The shaft 40 in FIG. 1 is shown primarily in the approximate bottom center of the bowl portion 30 of the pet dish but may be located on the base 10, top 20 or elsewhere on the pet dish 5. A shaft 40 may also extend through the pet dish base 10 and may include additional securing features to a support rod 50 such as a bolt or a screw. In other particular implementations, such as that illustrated in FIG. 5, the shaft walls 41 and shaft 40 may be formed as a removable component that includes the shaft walls 41 and a threaded extension 42 that extends through a similarly sized hole in the bottom of the pet dish 6 bowl portion 30. An optional gasket 44 may be included between the shaft walls 41 and the bowl portion 30 so that when a bolt or nut 43 is secured to the threaded extension 42, the inside of the bowl portion 30 is maintained water-tight.

FIG. 2 depicts a support rod 50 with three angled portions of a single support rod 50. A first angled portion 100 extends from a bottom end 70 of the support rod 50 to a dish perimeter extension arm 105 of the support rod 50. A second angled portion 110 extends from the dish perimeter extension arm 105 to a top cover extension arm 115 of the support rod 50. A third angled portion 120 extends from the top cover extension arm 115 to the top end 60 of the support rod 50. The top end 60 of the support rod 50 is substantially axially aligned with the first end 70 of the support rod 50 along a pivoting axis 55.

In the particular implementation of FIGS. 2A and 2B (collectively, FIG. 2), the first angled portion 100 of the support rod 50 creates an angle of approximately eighty degrees between the vertical axis of the bottom end 70 of the support rod 50 and the longitudinal axis of the dish perimeter extension arm 105. The second angled portion 100 of the support rod 50 creates an angle of approximately twenty two and a half between the vertical axis of the bottom end 70 of the support rod 50 and the longitudinal axis of the top cover extension arm 115. The third angled portion 120 realigns the vertical axis of the top end 60 of the support rod 50 with the vertical axis of the bottom end 70 of the support rod 50. The specific angles are not critical to the operation of the device, but are simply an example of an embodiment that works well with the particular components used in the particular non-limiting example shown.

The support rod of FIG. 2 may be formed from a single piece or may include separate parts. Three separate angle elements 100, 110 and 120 may be combined with four separate rod elements 60, 70, 105 and 115 or any other arrangement of angled portions and rod portions. Any number of angled portions of a support rod 50 could be employed to support a pet dish cover 80 and not deviate from the principles disclosed herein.

FIG. 2 also depicts other aspects of a pet dish. The top end 60 of the support rod may include a plate 125 of ferromagnetic materials that supports and facilitates the swiveling of a protective pet dish cover 80. The metal plate 125 of ferromagnetic materials may or may not be magnetized. In a particular implementation, the plate 125 comprises a flat top surface. In other implementations, the top surface of the plate 125 is rounded (semi-spherical). In particular implementations, the plate 125 is metal.

FIG. 3 depicts a protective dish cover 80 in the shape of a cone as a possible implementation, although the protective dish cover 80 only requires approximately the same dimensions as the perimeter of the top of the pet dish 5. However, the cone shape of the protective dish cover 80 is particularly useful in that it minimizes the space needed for the cover and increases the space available for the pet's head when pushing the cover 80 away from the pet dish 5 to access the food or water.

Figure 3A:
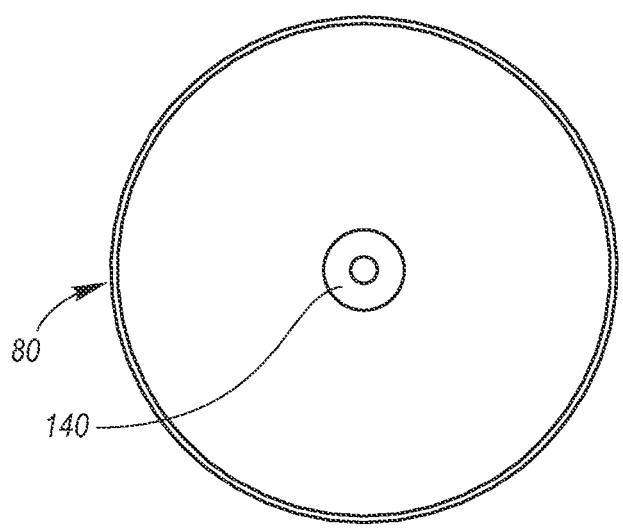
FIGS. 3A, 3B and 3C, respectively, depict a bottom, side and perspective cross-sectional view of a cone-shaped protective dish cover.
Figure 3B:
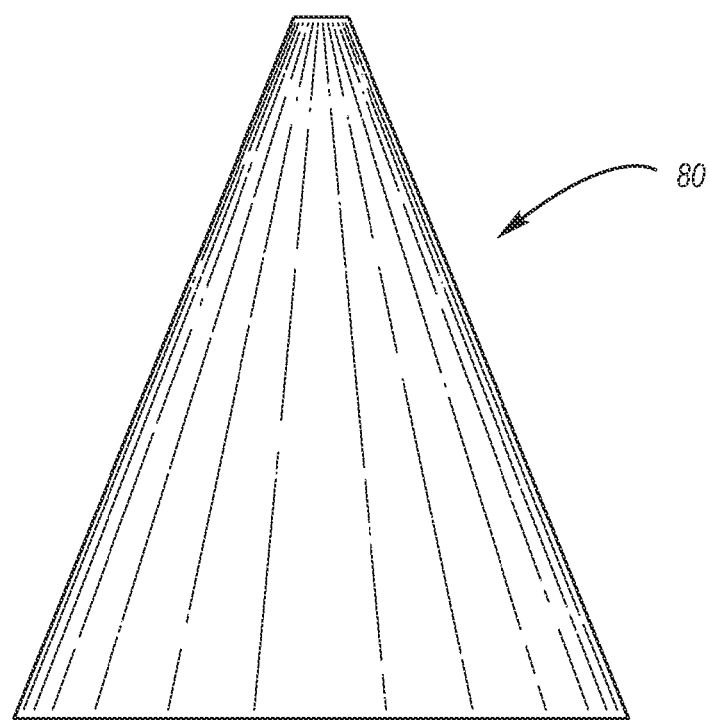
Figure 3C:
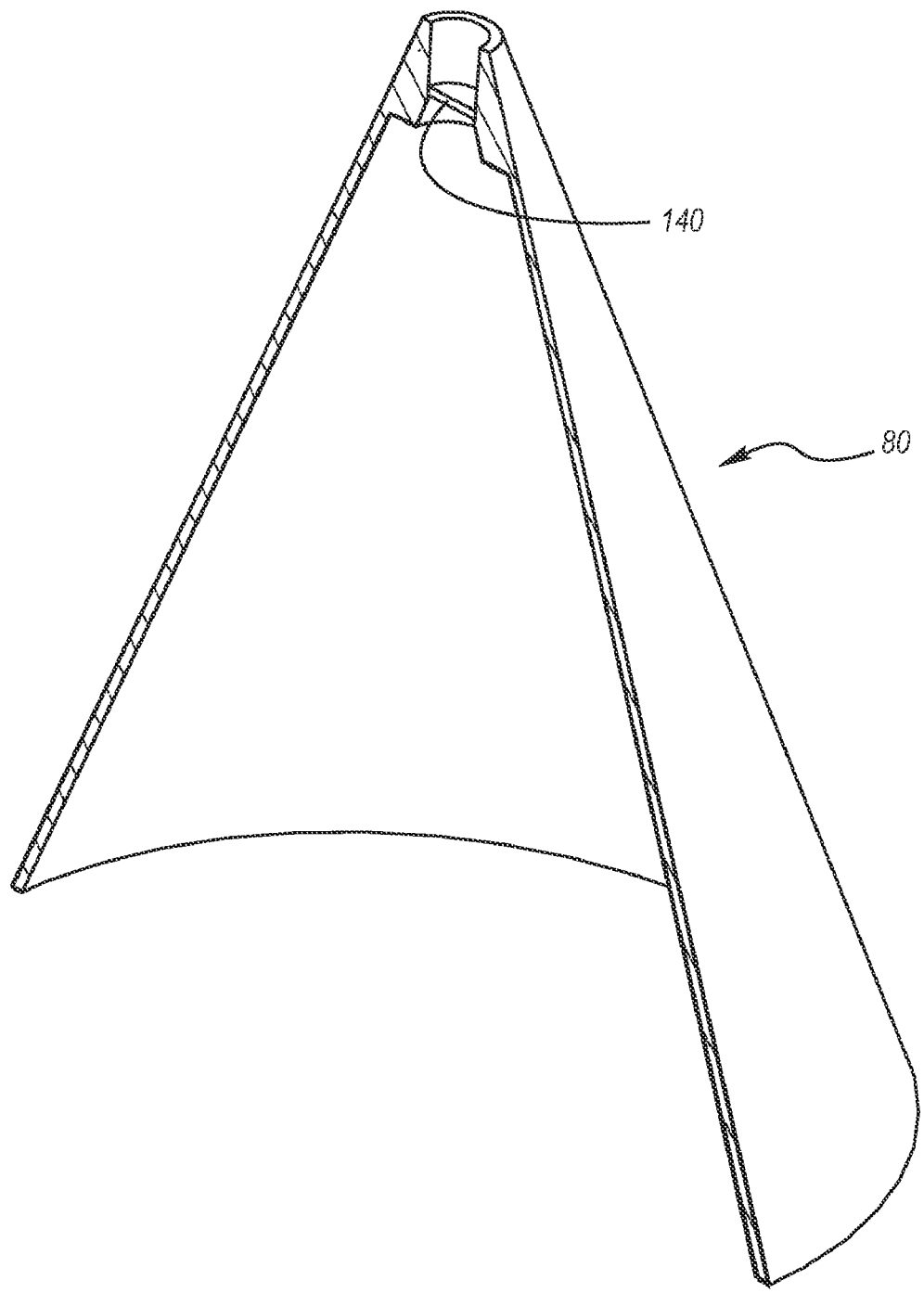

The protective dish cover 80 of FIGS. 3A, 3B and 3C (collectively FIG. 3) also includes an opening 95 that allows the insertion of the top end 60 and plate 125 of the support rod 50 to secure the protective dish cover 80 over the pet dish 5. The opening 95 of the protective dish cover 80 may be of any shape including angling outward toward the base of the cone shaped protective dish cover as shown in FIG. 3. A plate 140 of ferromagnetic material, which may or may not be magnetized, is included within a top end of the protective cover 80. A cap or handle 130 may or may not be included. In particular implementations, the cap 130 may be weighted to assist in leveling the protective cover 80 with the support rod plate 125. The cover plate 140 and/or the support rod plate 125 is magnetized so that the magnetic attraction between the cover plate 140 and the support rod plate 125 biases the protective cover 80 to its closed position (FIG. 4A) over the pet bowl 5.

The height of a pet dish cover 80 may vary based on the dimensions of the support rod 50 and the pet dish 5. Various implementations include a pet dish 5 of varying sizes that correlate with a support rod 50 and a protective dish cover 80 of different heights. According to one aspect of this disclosure, the pet dish cover 80, along with a support rod 50 and appropriately configured shaft assembly (such as that illustrated in FIG. 5), may be packaged and sold as an after-market kit. As an after-market kit, a one-size-fits-all or one-size-fits-many configuration may be used. These various implementations allow for the protective pet dish apparatus to be configured for differently sized pets with differently sized pet dishes 5. In other particular implementations, the shaft may comprise a rod and the support rod 50 may comprise an end coupling to receive the shaft therein whereby the end coupling of the support rod pivotally rotates about its axis on the shaft extending from the base.

Figure 4A:
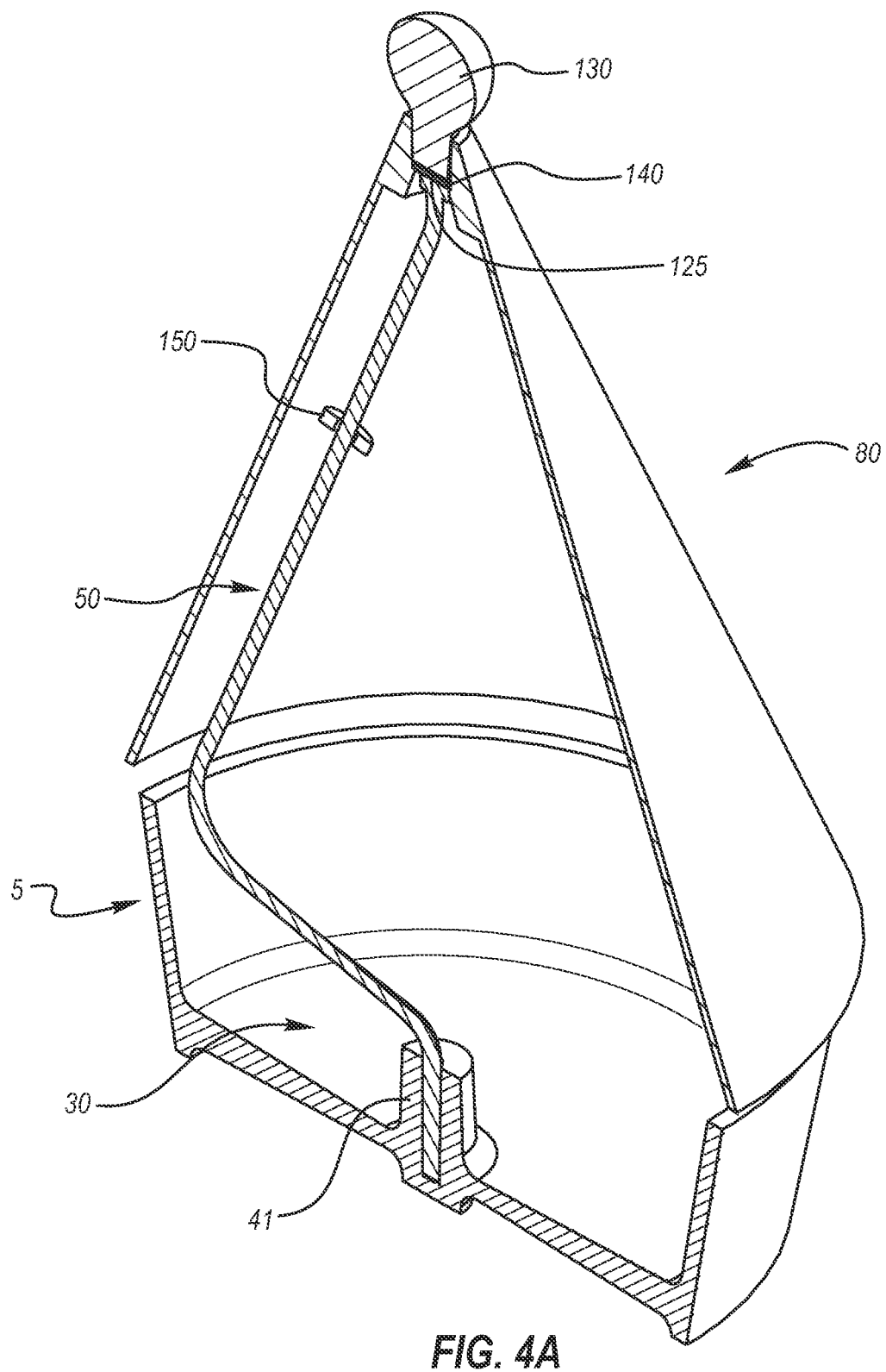
FIG. 4A depicts a perspective cross-sectional view of an assembled protective pet dish apparatus with a protective dish cover.
Figure 4B:
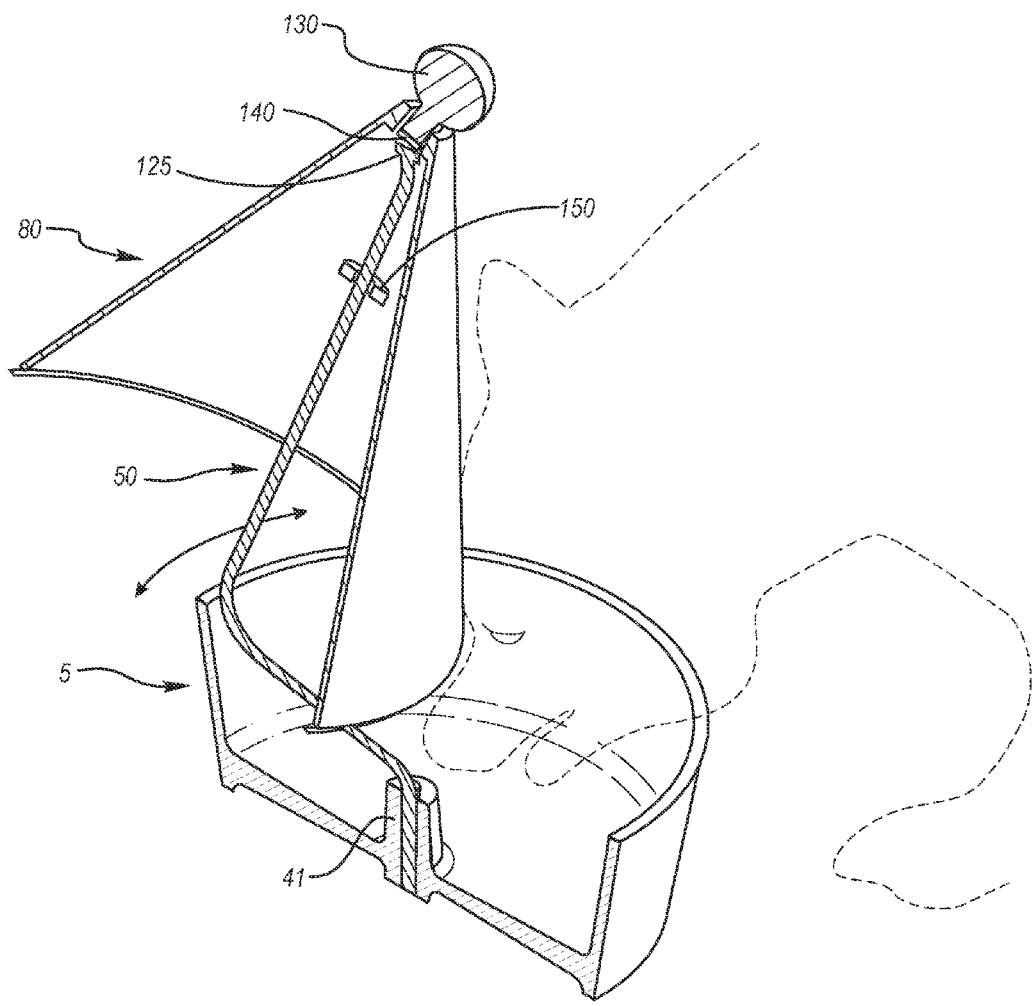
FIG. 4B depicts the perspective cross-sectional view of the assembled protective pet dish apparatus with the protective dish cover of FIG. 4A with the protective dish cover tipped to its open position.
Figure 5:
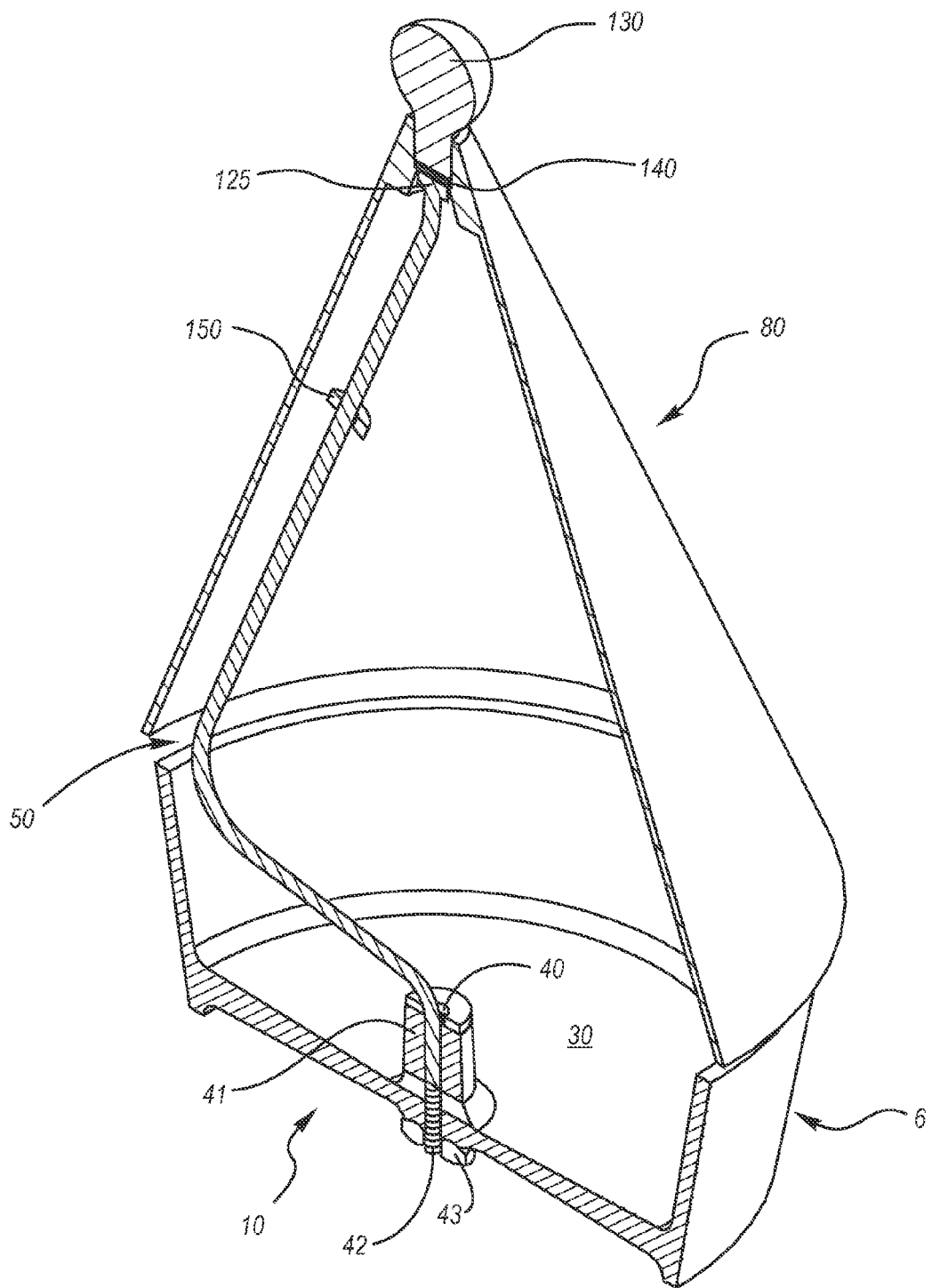
FIG. 5 depicts a second embodiment of a pet bowl with a support that is bolted through the bottom of the pet bowl.

FIGS. 4A and 4B depict the entire protective pet dish apparatus 1 with all elements combined. The support rod 50 sets within the shaft 40 at the bottom of the pet dish bowl portion 30. The support rod 50 is capable of pivoting about the vertical axis 55 of the bottom end 70 of the support rod 50. The support rod 50 is angled as referenced in FIG. 2 and as an element of the protective pet dish apparatus 1, the top end 60 and bottom end 70 of the support rod 50 pivot or rotate within the shaft 40 relatively concentric with each other.

FIGS. 4A and 4B also include a bearing wheel 150 that facilitates the swiveling of the support rod 50 within the protective dish cover 80. The bearing wheel 150 reduces friction between the support rod 50 and the protective dish cover 80 by allowing the support rod 50 to rotate with the bearing wheel 150 as a pet puts a force on the protective dish cover 80 as opposed to different portions of the support rod 50 making contact with the inside surface of the protective dish cover 80. Although a bearing wheel is illustrated in the implementation shown in FIGS. 4A and 4B, non-bearing wheels or other structures configured to reduce friction may alternatively be used, or no friction reducing component may be required.

In other particular implementations, it is contemplated that no wheel may be needed due to the relative materials used to make the support rod 50 and the protective dish cover 80 (i.e. plastic or low friction materials). Nevertheless, it may be desirable that the friction between the support rod 50 and the protective dish cover 80 be reduced so that if the cover 80 is pushed against the support rod 50 at the side of the pet dish 5, the support rod 50 will easily swivel away from that side and allow the perimeter of the protective dish cover 80 to be tilted inward toward the center of the pet dish.

The protective pet dish apparatus 1 depicted in FIG. 4A represents the protective dish apparatus 1 in a default or closed position. FIG. 4B represents the protective dish apparatus 1 in its open or access position. In operation, the magnetic attraction between the support rod plate 125 and the cover plate 140, in combination with gravity, biases the protective cover 80 to a closed position over the pet bowl 5. When the pet pushes the protective cover 80, if the support rod 50 is anywhere other than on the side of the pet bowl opposite the pet, the support rod 50 swivels away from the pet as the protective cover 80 is pushed. The force of the pet on the side of the protective cover 80 is sufficient to overcome the magnetic attraction between the support rod plate 125 and the cover plate 140 enough to allow the protective cover 80 to tilt to allow the pet access to food or water within the pet bowl 5. When the pet moves away, however, the magnetic attraction quickly levels the protective cover 80 so that it is centered over the pet bowl 5 to keep out unwanted birds, rodents and small animals. The magnetic attraction between the support rod plate 125 and the cover plate 140 may be adjusted in design to increase or decrease the force required to tilt the protective cover to keep out particular sizes, and strengths, of animals.

It will be understood that implementations are not limited to the specific components disclosed herein, as virtually any components consistent with the intended operation of the various implementations may be utilized. Accordingly, for example, it should be understood that, while the drawing figures accompanying text show and describe particular embodiments and implementations, components may comprise any shape, size, style, type, model, version, class, grade, measurement, concentration, material, weight, quantity, and/or the like consistent with the intended operation of a methods and/or system implementations.

The concepts disclosed herein are not limited to the specific implementations shown herein. For example, it is specifically contemplated that the components included in particular implementations may be formed of any of many different types of materials or combinations that can readily be formed into shaped objects and that are consistent with the intended operation of the implementations. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments may be manufactured separately and then assembled together, or any or all of the components may be manufactured simultaneously and integrally joined with one another. Manufacture of these components separately or simultaneously, as understood by those of ordinary skill in the art, may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations, it should be readily apparent that a number of modifications may be made without departing from the spirit thereof and that these implementations may be applied to other implementations disclosed or undisclosed. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

I claim:

1. A protective pet dish apparatus comprising:
    a pet dish having a base, a top and a bowl portion, the top having a size and shape;
    a substantially vertical shaft within the bowl portion extending toward the top, the substantially vertical shaft comprising a cylindrical opening surrounded by at least one shaft wall;
    a support rod comprising a cylindrical shape at a bottom end sized to fit within and pivotally rotate within the cylindrical opening of the substantially vertical shaft, the support rod further comprising an angled portion, and a top end comprising a support plate, the top end of the support rod positioned along a pivoting axis of the cylindrically shaped bottom end; and
    a dish cover comprising a top and a bottom, the bottom sized to approximate the size and shape of the top of the pet dish, the top comprising a cover plate positioned along a center axis of the dish cover;
    wherein the dish cover is biased to a closed position, centered over the pet dish.

2. The protective pet dish apparatus of claim 1, wherein the support rod plate comprises ferromagnetic materials and the cover plate comprises ferromagnetic materials and at least one of the support rod plate and the cover plate is magnetized.

3. The protective dish apparatus of claim 1, wherein the dish cover is biased to its closed position by magnetic attraction between the support rod plate and the cover plate.

4. The protective dish apparatus of claim 1, wherein the substantially vertical shaft comprises an extension that extends through the base of the pet dish.

5. The protective dish apparatus of claim 4, further comprising a gasket that surrounds the extension between the vertical shaft and the base of the pet dish.

6. The protective pet dish apparatus of claim 1, wherein the substantially vertical shaft is positioned in approximately in a center of the bowl portion.

7. The protective pet dish apparatus of claim 1, wherein the dish cover comprises a handle extending from the top of the cover.

8. The protective pet dish apparatus of claim 1, wherein at least one of the support rod plate and the cover plate comprises a substantially flat surface.

9. The protective pet dish apparatus of claim 1, wherein at least one of the support rod plate and the cover plate comprises a semi-circular top surface.

10. The protective pet dish apparatus of claim 1, further comprising a bearing wheel between the support rod and an internal wall of the pet dish cover.

11. The protective pet dish apparatus of claim 10, wherein the bearing wheel is mounted to the support rod.

12. A protective pet dish apparatus comprising:
    a pet dish having a base, a top and a bowl portion, the top having a size and shape;
    a substantially vertical shaft extending upward at the center of the bowl portion;
    a cone-shaped pet dish cover comprising a narrow top and a wide bottom, the narrow top comprising a cover plate having a ferromagnetic material and a flat, planar surface on an inside surface of the pet dish cover; and
    a support rod comprising a bottom end configured to pivotally rotate on the shaft, the support rod extending from the shaft to the narrow top of the pet dish cover and of a length to support the pet dish cover above the top of the pet dish, the support rod comprising a support rod plate at a top end having a ferromagnetic material and a flat, planar surface which contacts the flat, planar surface on the inside surface of the pet dish cover when the support rod supports the pet dish cover;
    wherein the support rod supports the pet dish cover such that the pet dish cover is centered over the pet dish and when force is applied to the wide bottom of the pet dish cover to shift the pet dish cover off-center in relation to the pet dish, magnetic attraction between the cover plate and the support rod plate biases the pet dish cover back to its closed position centered over the pet dish.

13. The protective pet dish apparatus of claim 12, wherein at least one of the support rod plate and the cover plate is magnetized.

14. The protective dish apparatus of claim 12, wherein the substantially vertical shaft comprises an extension that extends through the base of the pet dish.

15. The protective dish apparatus of claim 14, further comprising a gasket that surrounds the extension between the vertical shaft and the base of the pet dish.

16. The protective pet dish apparatus of claim 12, wherein the dish cover comprises a handle extending from the top of the pet dish cover.

17. The protective pet dish apparatus of claim 12, further comprising a bearing wheel between the support rod and an internal wall of the pet dish cover.

18. The protective pet dish apparatus of claim 17, wherein the bearing wheel is mounted to the support rod.

19. The protective pet dish apparatus of claim 12, wherein the support rod comprises at least two angled bends in the support rod, one positioned above the shaft to angle the support rod from the center of the bowl portion toward its edge, and one positioned in the support rod near the edge of the bowl portion to angle the support rod from near the edge toward a center axis of the bowl above the shaft.

20. The protective pet dish apparatus of claim 19, further comprising at least a third angled bend in the support rod, the third angled bend positioned near the top end and angled to align the support rod with a pivotal axis of rotation for the support rod in relation to the shaft.

* * * * *